United States Patent [19]

Biggs et al.

[11] 4,050,617

[45] Sept. 27, 1977

[54] METHOD AND APPARATUS FOR STUFFING RIBBONS

[75] Inventors: Donald William Biggs, Webster; Wilson Parker Rayfield, Pittsford, both of N.Y.

[73] Assignee: Burroughs Corporation, Detroit, Mich.

[21] Appl. No.: 736,629

[22] Filed: Oct. 28, 1976

[51] Int. Cl.[2] .................. G03B 1/58

[52] U.S. Cl. .................. 226/1; 226/91; 197/168

[58] Field of Search .................. 226/1, 90–92, 226/114; 360/93, 95, 132; 197/151, 154, 158

[56] References Cited

U.S. PATENT DOCUMENTS

| | | | |
|---|---|---|---|
| 3,941,231 | 3/1976 | Matuck et al. .................. | 226/90 |
| 3,964,100 | 6/1976 | Bennett et al. .................. | 360/95 |

*Primary Examiner*—Robert W. Saifer

*Attorney, Agent, or Firm*—Kevin R. Peterson; Edward J. Feeney, Jr.; Lynn L. Augspurger

[57] ABSTRACT

Disclosed is a method and apparatus for stuffing ribbons in a cartridge including a cartridge base receiver plate, a cam guided threader, and a measured length stuffer. A lid applier clamps the lid on the base of the cartridge and the cartridge is ejected from the apparatus for sealing the ribbon in a continuous loop.

10 Claims, 8 Drawing Figures

METHOD AND APPARATUS FOR STUFFING RIBBONS

BACKGROUND OF THE INVENTION

Figure 1:
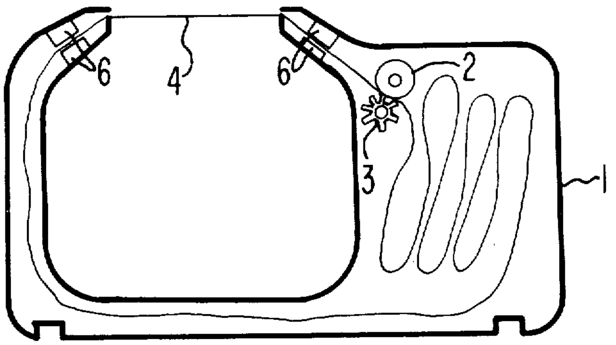

With the resurgence of the so-called "bouncing ball" and matrix pin printers in typewriters and serial printers for computers the penchant has been given to the use of a cartridge to contain the ribbon.

Various cartridges have been designed. Cartridges which do not hold a continuous ribbon have become quite bulky in order to have an adequate supply of ribbon for the printing operation because it is not desirable to replace the ribbons frequently. The response to this problem has been to develop cartridges which have a continuous reusable inked ribbon. These cartridges typically have an adequate supply of film or cloth ribbon stuffed in a storage bin. The cartridges are designed usually to have an aperture in the center of a cartridge and the ribbon is drawn across the aperture at the print position. The ribbon is guided by the shape of the cartridge to and from this position where the printer is to be effective.

Stuffing these cartridges has been a problem which has been difficult to solve. The prior art method known to be actually used utilized manual threading of the cartridge and a pneumatic stuffer to blow the ribbon into the cartridge. This has several disadvantages in that the amount of ribbon was not uniformly measured and the number of units which could be processed depended upon the skill of the operator to a great degree.

SUMMARY OF THE INVENTION

It is the object of the invention to provide a mechanical threader and stuffer for cartridges having a print head aperture and a ribbon storage bin in which the completed cartridge has a ribbon formed as a continuous loop which can be drawn across a print position of data processing equipment and returned to the storage bin after use.

In accordance with this object an apparatus for stuffing a ribbon in an endless tape cartridge has been provided which has a frame for receiving the cartridge and a stationary guide cam mounted on the frame to surround a cartridge to be stuffed. A threader cam follower adapted to rotate in the frame and follow the guide cam carries a threader pin depending therefrom and the pin is adapted to intersect a ribbon drawn from a supply roll. The ribbon has it free end clamped at a position within the guide cam, and to the movement of the pin draws the ribbon with the pin as the cam follower rotates about the guide cam. A ribbon clamp holds the free end of the ribbon in the clamped position within the guide cam, and a driven motor rotates the follower about said guide cam to thereby cause the ribbon to be drawn through the cartridge to be threaded to complete threading of the cartiridge to be stuffed.

A measured length of ribbon is driven into the cartridge after the ribbon is threaded through the cartridge and the lid applied. Thereafter a festoon drive draws the ribbon from its threading path into position for engagement by said ribbon clamp and the ribbon is clamped and cut off there to complete the operation.

Accordingly, it will be seen, after a review of the detailed disclosure which follows, that a unique mechanical method of stuffing ribbon in a cartridge has been provided in which one-half of the cartridge to be stuffed is placed in a cartridge stuffing apparatus having a supply of ribbon with the free end of the ribbon clamped in a clamp position thereon. The threader cam follower pin is caused to be positioned against the ribbon and drawn through the path of the ribbon and into the cartridge, while the free end remains clamped. The clamped free end of the ribbon is released after the ribbon has been partially threaded into the cartridge and the friction of the two-ply ribbon maintains the ribbon on the pin through the completion of the threading operation. This is completed by mechanically drawing the ribbon through the remaining portion of the cartridge along the path to be threaded. Thereafter, a drive element in the cartridge is inserted to bear against the threaded ribbon so that it can be driven like a capstan drive and the lid half of the cartridge is applied to hold it in position. The drive element feeds a supply of ribbon from said supply roll into a chamber in the cartridge. Thereafter, the festoon element is drawn across the path of the ribbon to draw the supply end of the ribbon to the clamping position, and ribbon is severed and clamped at that point to free the cartridge from the apparatus.

Figure 2:
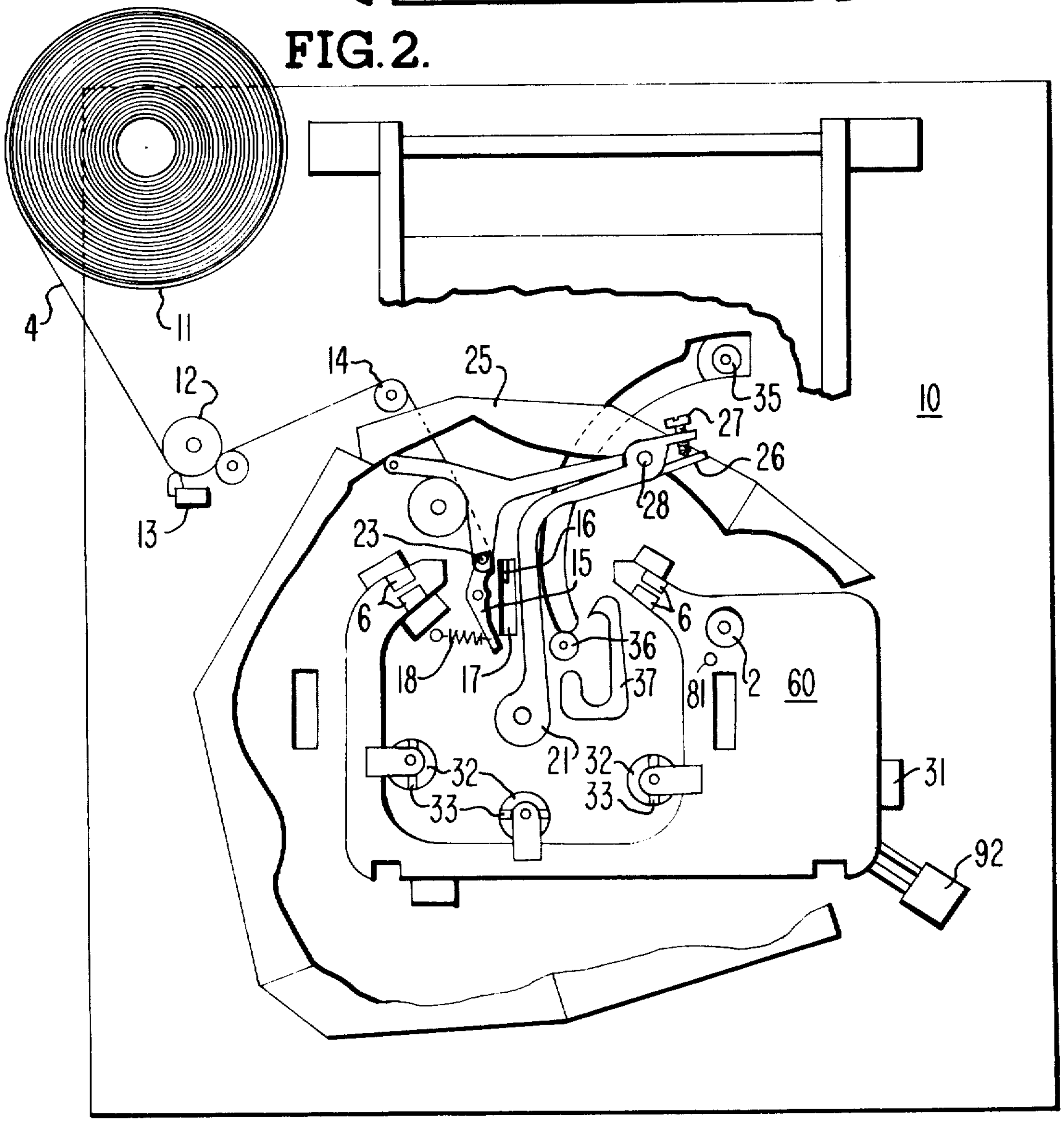
Figure 6:
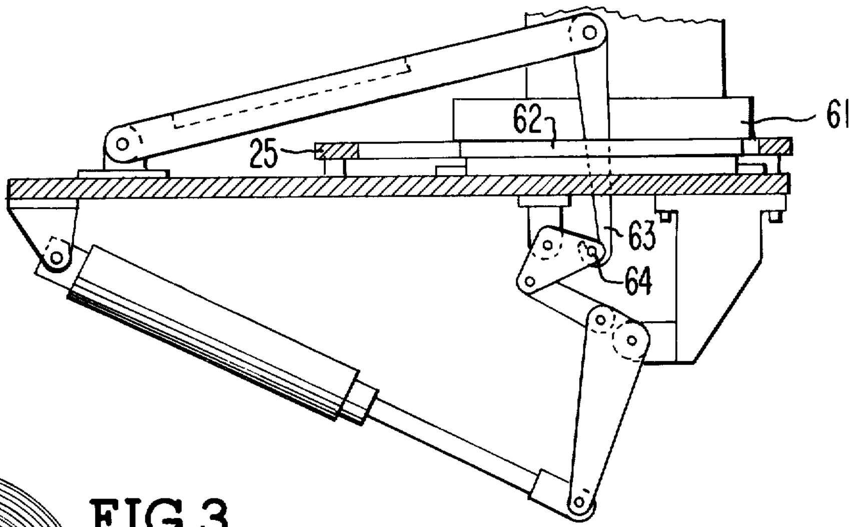
Figure 3:
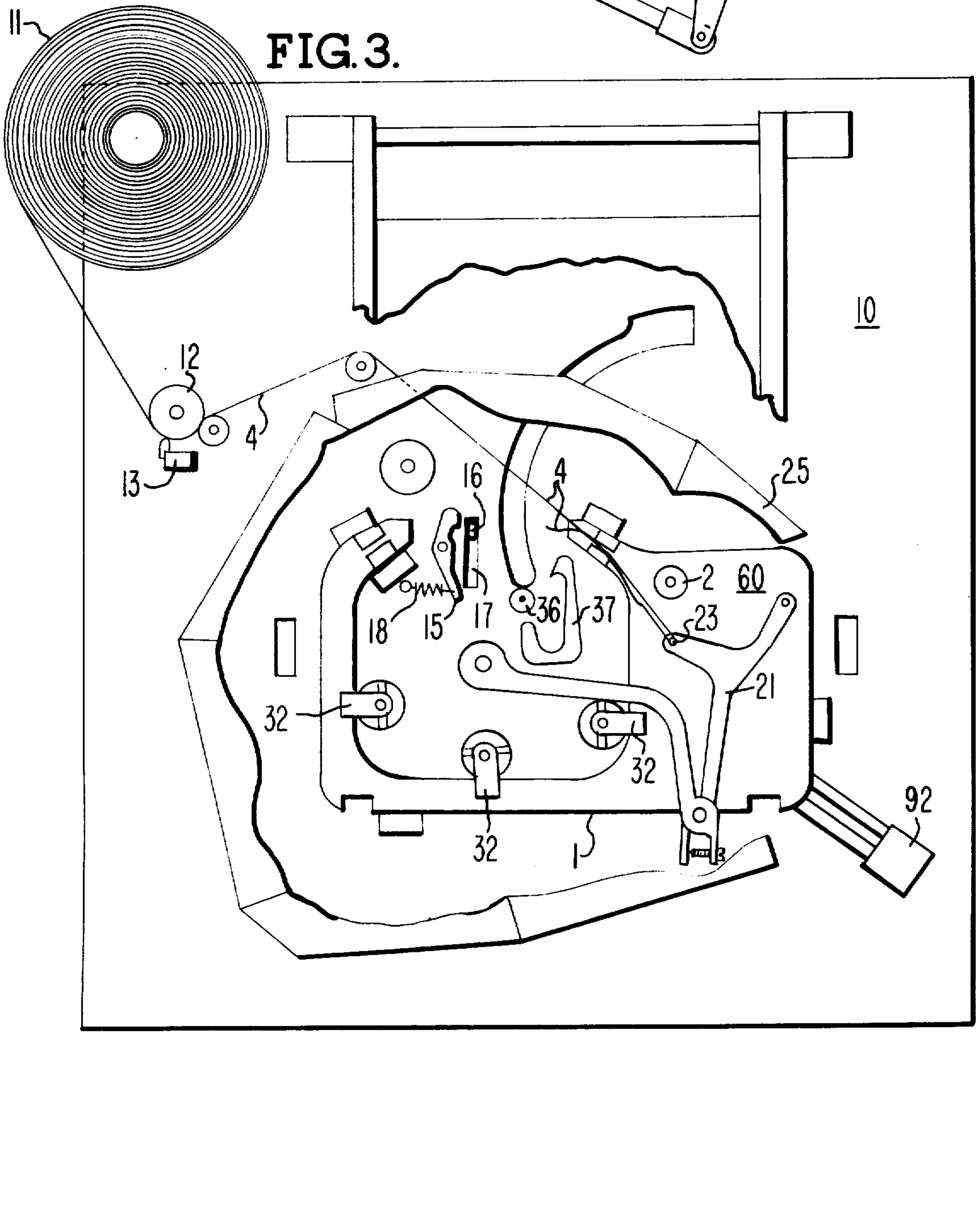
Figure 7:
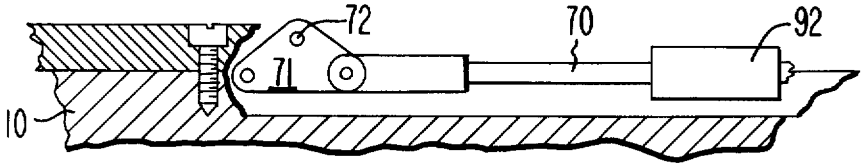
Figure 4:
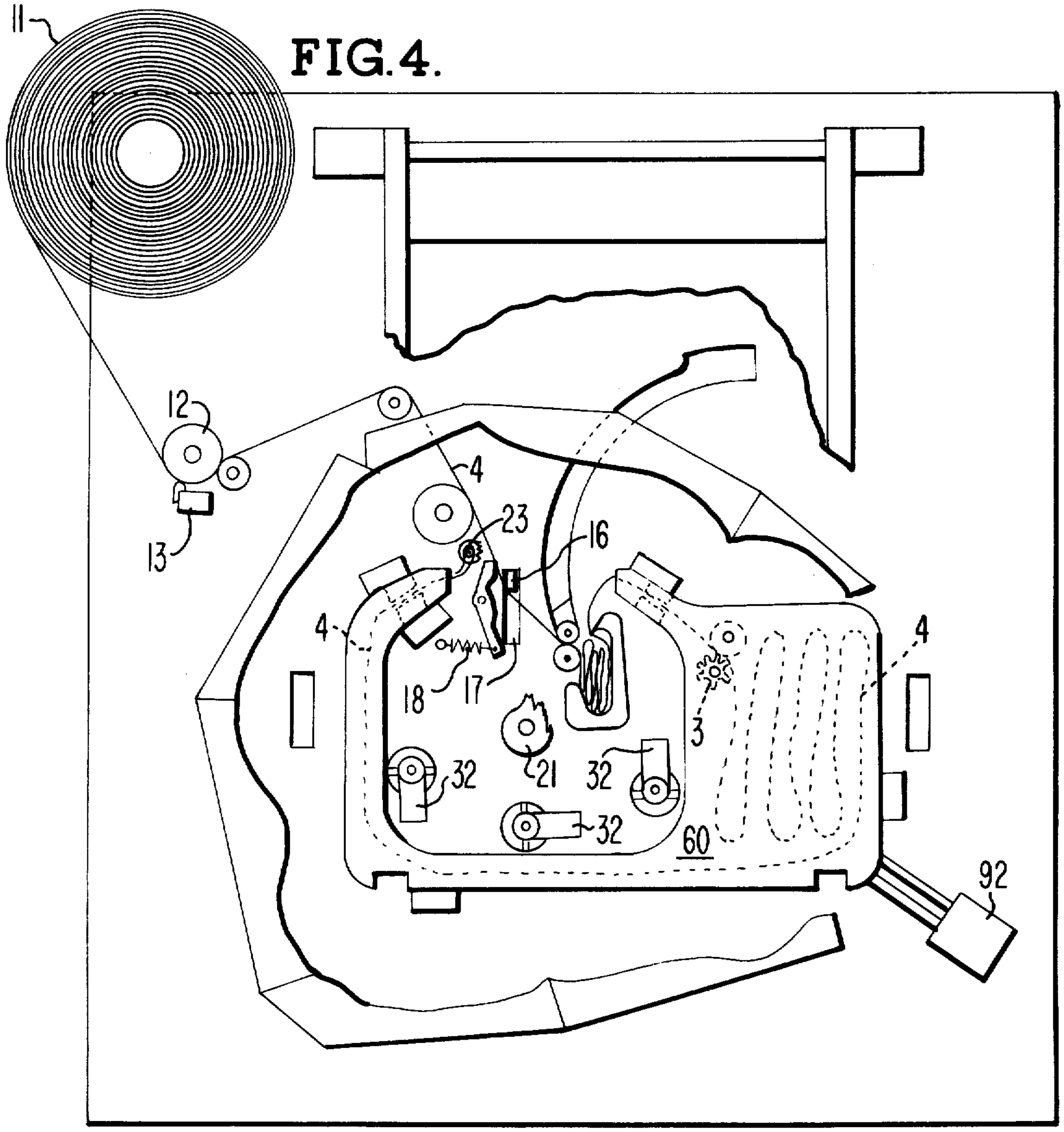
Figure 8:
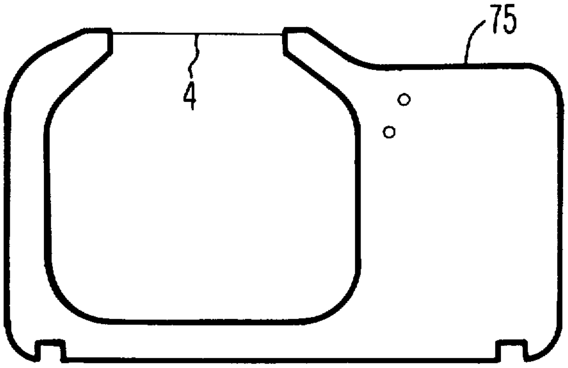
Figure 5:
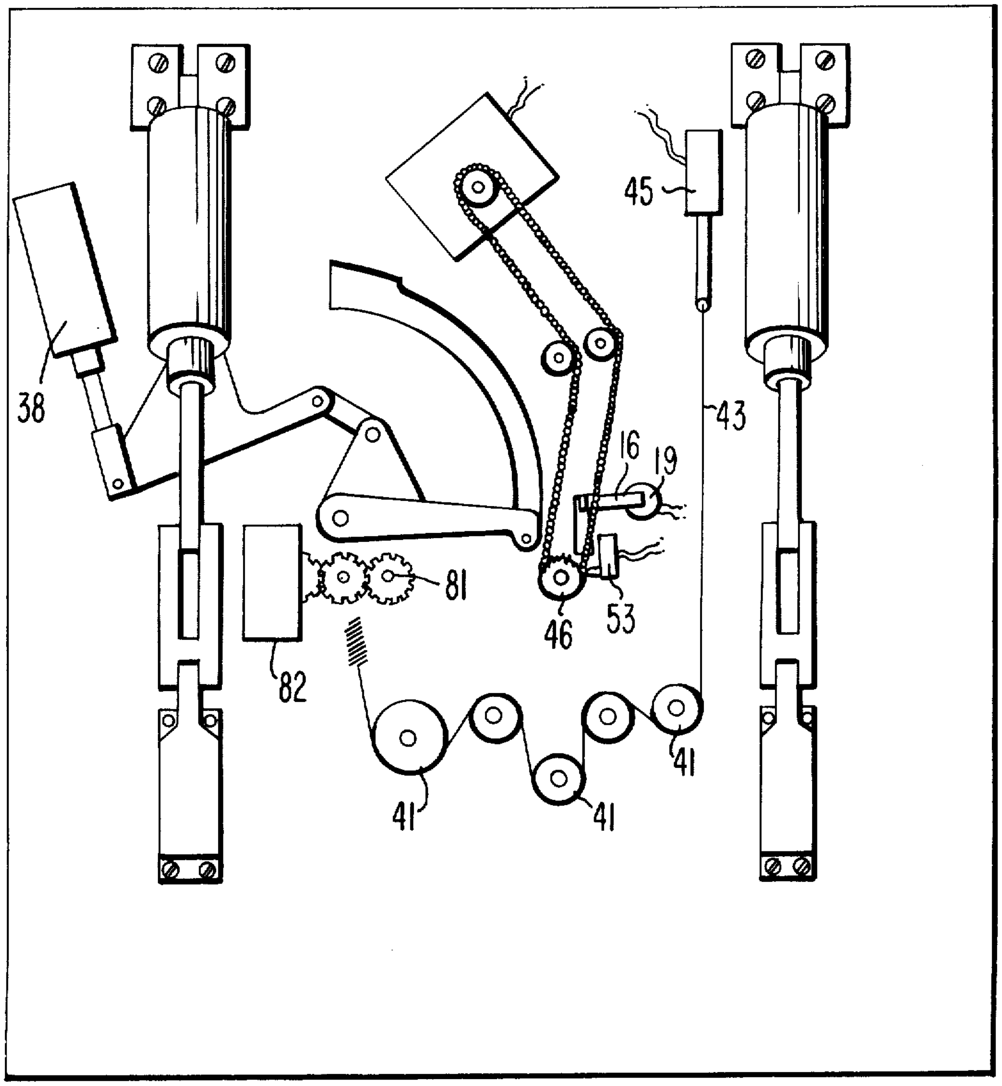

For complete understanding of the preferred embodiment of our invention, reference should be made to the following description and drawings in which:

FIG. 1 represents the cartridge which is to be stuffed by the apparatus in accordance with the method described herein; and FIG. 2 is a top plan view of the apparatus showing the threading start position; and FIG. 3 is a top plan view of the apparatus showing the initial threaded position; and FIG. 4 is a top plan view of the apparatus showing the ribbon stuffing operation; and FIG. 5 is a bottom plan view of the apparatus shown in FIGS. 2, 3 and 4; and FIG. 6 is a side elevation of the apparatus showing the lid applier in more detail; and FIG. 7 is a detail of the cartridge eject mechanism; and FIG. 8 is a view of the completed cartridge.

Referring now to the drawings in more detail, it will be understood that the drawings are of necessity schematic drawings for illustrative purposes which show the positionin interrelationship of the important elements of the apparatus. Those skilled in the art would be able to manufacture the apparatus based upon the accompanying description and drawings; however, a slavish reproduction of the drawings herein should not be attempted.

In FIG. 1, the cartridge is shown with the lid off. The cartridge body 1 has disposed therein a capstan 2 which is engaged by a drive gear 3. It will be seen that after the gear 3 is inserted to bear against the ribbon, the stuffing of the cartridge can be completed by driving the gear a measured distance. The ribbon 4 is drawn through the cartridge body 1 by the apparatus disclosed in FIG. 2 and the lid is applied as described hereinafter, but before stuffing, as will be described.

The apparatus shown in FIG. 2 has a frame plate 10 on which the elements of the apparatus are mounted. A supply roll 11 provides the ribbon 4 to the ribbon stuffing apparatus. The ribbon 4 is drawn about an idler roller 12 against which is disposed a splice detector microswitch 13. The ribbon which is described herein is a fabric nylon ribbon impregnated with ink. It will be understood, however, that the ribbon within the meaning of this application includes a broader group of films and tapes which are loaded in a cartridge like the ribbon described herein. The splice detector 13 is set to measure a ribbon thickness equal to or exceeding 5 mils. The normal thickness of the ribbon is less than 5 mils so that a splice or other defect in the ribbon will be detected by the microswitch and the feed mechanism halted by a logic circuit, not shown.

The ribbon 4 is drawn past the splice detector 13 and across a feed roller 14 and thereafter under a guide cam 25 to the threading and stuffing apparatus. The threading and stuffing apparatus is shown in several views showing different positions of the elements thereof in FIGS. 2, 3 and 4 by way of a top plan view and in FIG. 5 by way of an underneath or bottom plan view of the frame plate 10.

FIG. 2 illustrates the start position of the ribbon 4. FIG. 3 shows the ribbon after it has been initially threaded into the cartridge body 1. FIG. 4 shows how the ribbon is stuffed and prepared for finishing after the lid has been applied.

Referring now to FIG. 2, it will be seen that a principal arrangement of the threading apparatus constitutes a threader cam follower 21. The threader cam follower is guided by the guide cam 25 as the follower is caused to rotate. The guide cam 25 is a stationary plate cam raised from the surface of the frame plate 10 so that the ribbon 4 may be drawn beneath it and threaded into the cartridge body 1. Initially, the ribbon 4 is held by a rocker clamp 15 which clamps the free end of the ribbons against a cut-off blade 16 which holds the ribbon 4 against a cut-off blade 16 when the blade extends up through a cut-off blade slot 17 in the frame plate 10. A roller clamp spring 18 biases the roller clamp against the cut-off blade 16. When the cut-off blade 16 is retracted through cut-off blade slot 17 the free end of ribbon 4 is released, as at the intermediate point of the cycle shown in FIG. 3. When the cut-off blade is inserted up through the cut-off blade slot 17 at the end of the cycle to be described, the ribbon which passes between the cut-off blade 16 and the roller clamp 16 is severed and the free end of the supply spool ribbon is held. Thus, in the initial position, this free end of the ribbon is held between the roller clamp 15 and the cut-off blade 16.

Immediately to the left of the ribbon 4, adjacent the cut-off blade and roller clamp 15, is a depending threader pin 23 mounted in the threader cam follower 21. From this initial position the depending threader pin 23 is caused to rotate in a clockwise direction as shown in FIGS. 2, 3 and 4, through the cartridge body 1 and back to its initial position as shown in FIG. 2. Throughout this movement the threader cam follower follows the guide cam 25. The cam follower 21 has, on its flexure arm, a back-up spring 26 and a stop screw 27 so as to prevent the follower from springing outwardly too far. The flexible arm pin 28 of the cam follower has mounted thereabout a spring to bias the outer arm of the threader cam follower 21 against the cam guide 25.

When the cartridge is inserted in the apparatus on the frame plate 10, the cartridge body is positioned by positioning lugs 31 mounted in appropriate positions on the frame plate 10. Clamps 32 are mounted on the plate 10 to clamp the cartridge body down in position. These clamps 32 ride on a face mounting bearing having a "*v*" slot 33 so that a corresponding "*v*" lug on the clamp will rest in the "*v*" slot 33 when the clamp is in its clamped position and when the clamp is rotated, the interference of the "*v*" slotted lug will cause the clamp to rise as it moves out of the way of the cartridge body 1.

The cartridge body 1, when it is initially inserted, is the bottom half of the full cartridge. This bottom half has bearing surfaces 6, such as felt, at the mouth of the ribbon holding arms through which the ribbon is drawn. The ribbon is then drawn over a capstan drive position. At this point a capstan 2 is positioned. After the ribbon has been threaded, the capstan, which has a flexible surface, will mesh with a drive gear 3 (see FIG. 1) so that the ribbon may be driven into the cartridge body by rotation of the drive gear 3 in the clockwise direction. This drive gear remains in the cartridge and is used to drive the ribbon during the printing operation as well. This is made possible by the insertion into the slot end of the gear's pin which is exposed on the outer surface of the cartridge of a tongue of a drive shaft for the gear. Rotation of this shaft 81 (which is not shown in FIGS. 2, 3 and 4) is measured by counter 82 so that a precise amount of ribbon is stuffed in the cartridge.

Also seen in FIG. 2 is a festoon capstan 35 shown it its retracted position away from the festoon drive roller 36. The festoon capstan will be moved into the engagement with the festoon drive roller in time to drive the ribbon into the festoon pocket 37 before completion of the assembly operation described herein.

Continuing on to FIG. 3, it will be seen that after the threader pin has been moved into engagement with the ribbon 4 when it intersects the path of the ribbon as it is initially clamped, it drags the ribbon with it along with the cam follower and into the cartridge body. At this point the ribbon is wrapped about the depending pin 23 of the cam follower 21 so that two plies of ribbon trail the depending pin 23. This is because until the point shown in FIG. 3 is reached, the free end of the ribbon is held clamped by the clamp rocker lever arm 15. As the cam follower 21 reaches the point shown in FIG. 3, the cut-off blade by solenoid 19 is retracted and the ribbon 4 is released and no longer held by the rocker arm 15 against the cut-off blade which has been withdrawn below the surface of the plate pin through slot 17. At this point the clamp 32 still holds the cartridge in position.

It is an important feature to note here that the friction of two plies of the trailing free end of the ribbon is sufficient to maintain the ribbon wrapped about the depending pin 23 of the cam follower 21 as it progresses all the way around inside the cartridge body 1 even though some slippage may occur. During this point of travel a drive pin cam 46 (see FIG. 5) mounted on the shaft with the threader cam follower activates in a logical sequence a drive microswitch 53 which acts as a sequencing microswitch for the position of the threader cam follower 21.

Before the ribbon has been threaded into the cartridge body 1 far enough to have interference with the clamps 32, this control microswitch 53 activates a clamp retract solenoid 45 whose travel is sufficient to draw the drive band 43 far enough to cause the clamp rollers 41 to rotate and cause the "*v*" interface to lift the cam and rotate it 90° to release the cartridge body and move the clamps to the position shown in FIG. 4. This solenoid 45 can also be independently activated by pressing a switch, not shown, when the cartridge is inserted in the apparatus.

Referring to FIG. 4, it will be seen that the cam follower 21 is shown cut away. This is to better show the end position of the ribbon 4 at the end of the travel of the pin 23.

As shown, the ribbon leaving the supply spool is ready to be cut off. To reach this point of illustration, the ribbon 4 has been threaded all the way around through the inner body of the cartridge. Thereafter the drive gear 3 has been inserted in position and the lid of the cartridge clamped in position by the lid applier shown in FIG. 6. After this has been accomplished, the drive gear and capstan can rapidly draw ribbon from the supply roll 11 into the folded loop compartment portion of the cartridge 1. This folded loop compartment 60 in the cartridge illustrated is stuffed with approximately 23 feet of ribbon. The precise amount is measured by counting the number of revolutions of the drive gear 3 with the drive counter 82. Thus, precise measurement of the ribbon stuffed into the cartridge is achieved.

Thereafter, the festoon capstan 35 is moved into position against the drive roller 36. The festoon capstan 35 is mounted on an arm and actuated by the linkage shown in FIG. 5 in response to movement of the pneumatic cylinder for the festoon 38. Then the festoon drive roller 36 is actuated (drive not shown) for a counted number of revolutions to fill the festoon pocket 37 with an additional supply of ribbon such as 1 to 2 feet.

Thereafter, the cut-off blade 16 is inserted back up through the cut-off blade slot 17 and into engagement with the rocker clamp 15 to sever the ribbon 4 and clamp it in position for the next operation. At this point the lid applier can be raised and the cartridge ejected. The lid applier is shown in more detail in FIG. 6. The lid applier has a plate 61 which is shown in the locked position. In this position the lid 62 has been snapped on the bottom of the cartridge. In this position the clamp hook 63 locks the plate 61 in the down position as the rocker pin 64 has just entered its dead center position with the full extension of the lid applier cylinder 65. In this position it will be seen that the linkage holds the lid in position while the stuffing operation proceeds.

At the end of the stuffing operation the applier cylinder rods are retracted and the cartridge ejected by the mechanism shown in FIG. 7. Here the push rod 70 is linked to the eject finger 71 which is journaled to rotate on the frame 10 about the pin. A push left on the rod causes the finger to pivot and raise the cartridge. Note that this same linkage may be used with the push rod connection at the opposite ends of the eject fingers at hole 73. This linkage can be used on the opposite side of the cartridge. In this instance the push rod will be actuated as a pull rod. Thus the same rod can be driven in one direction as an armature of a solenoid 92 and the ejection of the cartridge completed.

Thereafter, the assembled cartridge can be taken to an ultrasonic welder and the loose ends interconnected to form the completed cartridge 74 shown in FIG. 8.

While the preferred embodiment of my invention has been shown in illustrative detail, modifications thereof will occur to those skilled in the art, both now and in the future. The scope of my invention should be interpreted in light of the following claims.

What is claimed is:

1. An apparatus for stuffing a ribbon in an endless tape cartridge comprising:

a frame;

a stationary guide cam mounted on the frame to surround a cartridge to be stuffed;

a threader cam follower adapted to rotate and follow the guide cam;

a threader pin carried by said cam follower depending therefrom and adapted to intersect a ribbon drawn from a supply roll, and having its free end clamped at a position within the guide cam and adapted to draw the ribbon with the pin as the cam follower rotates about the guide cam;

a ribbon clamp for holding said free end of said ribbon in the clamped position within the guide cam; and drive means to drive said follower about said guide cam to thereby cause said ribbon to be drawn through the cartridge to be threaded to complete threading of the cartridge to be stuffed.

2. An apparatus according to claim 1 wherein means are provided to drive a measured length of ribbon into the cartridge after said ribbon is threaded in the cartridge.

3. An apparatus according to claim 1 wherein festoon drive means are provided to draw the ribbon into position for engagement by said ribbon clamp.

4. An apparatus according to claim 3 wherein the festoon drive means are adapted to be actuated to drive a supply of ribbon from said supply roll after said cartridge has been stuffed and before the ribbon for the cartridge has been severed from the supply spool of ribbon.

5. An apparatus according to claim 1 including means to sever the ribbon which has been threaded through the cartridge from the supply spool.

6. An apparatus according to claim 1 including means to apply lid to said cartridge after the cartridge has been threaded.

7. An apparatus according to claim 1 including means to eject the cartridge from the apparatus after it has been stuffed with the ribbon.

8. A method of stuffing ribbon in a cartridge comprising providing the cartridge to be stuffed to a cartridge stuffing apparatus having a supply of ribbon with the free end of the ribbon clamped to the clamp position thereon;

causing a threader cam follower pin to be positioned against the ribbon and drawn through its path and into the cartridge while the free end remains clamped;

releasing the clamped free end of the ribbon after the ribbon has been partially threaded into the cartridge; and mechanically drawing the ribbon through the remaining portion of the cartridge along the path to be threaded.

9. A method according to claim 8 further including:

placing a drive element in the cartridge to bear against the threaded ribbon;

applying the lid of the cartridge to the cartridge on the apparatus; and actuating the drive element to feed a supply of ribbon from said supply roll into a chamber in the cartridge.

10. A method according to claim 9 further including drawing a festoon element across the path of the ribbon to draw the supply end of the ribbon to a clamping position; and severing and clamping the ribbon at that point to free the cartridge from the apparatus.

* * * * *